(12) United States Patent
Zuo et al.

(10) Patent No.: US 7,382,571 B2
(45) Date of Patent: Jun. 3, 2008

(54) PRESSURE EQUALIZING FLUID FLOW STRIPPER APPARATUS

(75) Inventors: Xu Zuo, Prior Lake, MN (US); Mark Toffle, St. Louis Park, MN (US); Xiaohong Sun, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 534 days.

(21) Appl. No.: 10/914,517

(22) Filed: Aug. 9, 2004

(65) Prior Publication Data

US 2006/0028760 A1 Feb. 9, 2006

(51) Int. Cl.
*G11B 33/14* (2006.01)
*G11B 25/04* (2006.01)

(52) U.S. Cl. ................................. 360/97.02; 360/97.03

(58) Field of Classification Search ............. 360/97.01, 360/97.02, 97.03, 98.01
See application file for complete search history.

(56) References Cited

U.S. PATENT DOCUMENTS

| | | | |
|---|---|---|---|
| 5,453,890 A * | 9/1995 | Takegami et al. | 360/97.02 |
| 5,537,281 A * | 7/1996 | Ma et al. | 360/133 |
| 5,619,391 A * | 4/1997 | Getzoyan et al. | 360/133 |
| 5,748,609 A * | 5/1998 | Tanaka | 360/133 |
| 6,493,310 B1 * | 12/2002 | Kim et al. | 720/611 |
| 6,788,493 B1 * | 9/2004 | Subramaniam et al. | 360/97.02 |
| 2002/0149876 A1 | 10/2002 | Sakata et al. | |
| 2002/0154441 A1 * | 10/2002 | Tadepalli et al. | 360/97.02 |
| 2003/0117746 A1 * | 6/2003 | Kovinskaya et al. | 360/97.02 |
| 2003/0151848 A1 * | 8/2003 | Lee | 360/97.02 |
| 2003/0179493 A1 | 9/2003 | Kim | |

FOREIGN PATENT DOCUMENTS

JP 03168985 A * 7/1991

* cited by examiner

*Primary Examiner*—Craig A Renner
(74) *Attorney, Agent, or Firm*—Fellers, Snider, et al.

(57) ABSTRACT

Various embodiments of the present invention are generally directed to attenuating excitation energy of a rotatable storage medium using one or more plates each having a plurality of parallel channels to buffer fluid flow across an associated medium surface. A preferred embodiment includes a plurality of channels in facing relation to a common surface of a rotatable storage medium. Further included in a preferred embodiment, the plurality of channels are sequentially arranged into a first, second, and third channels with differing sidewall characterizations. In an alternative embodiment, a plurality of storage mediums which are axially aligned have a plurality of channels in facing relation to either a top or bottom surface of a rotatable storage medium.

15 Claims, 11 Drawing Sheets

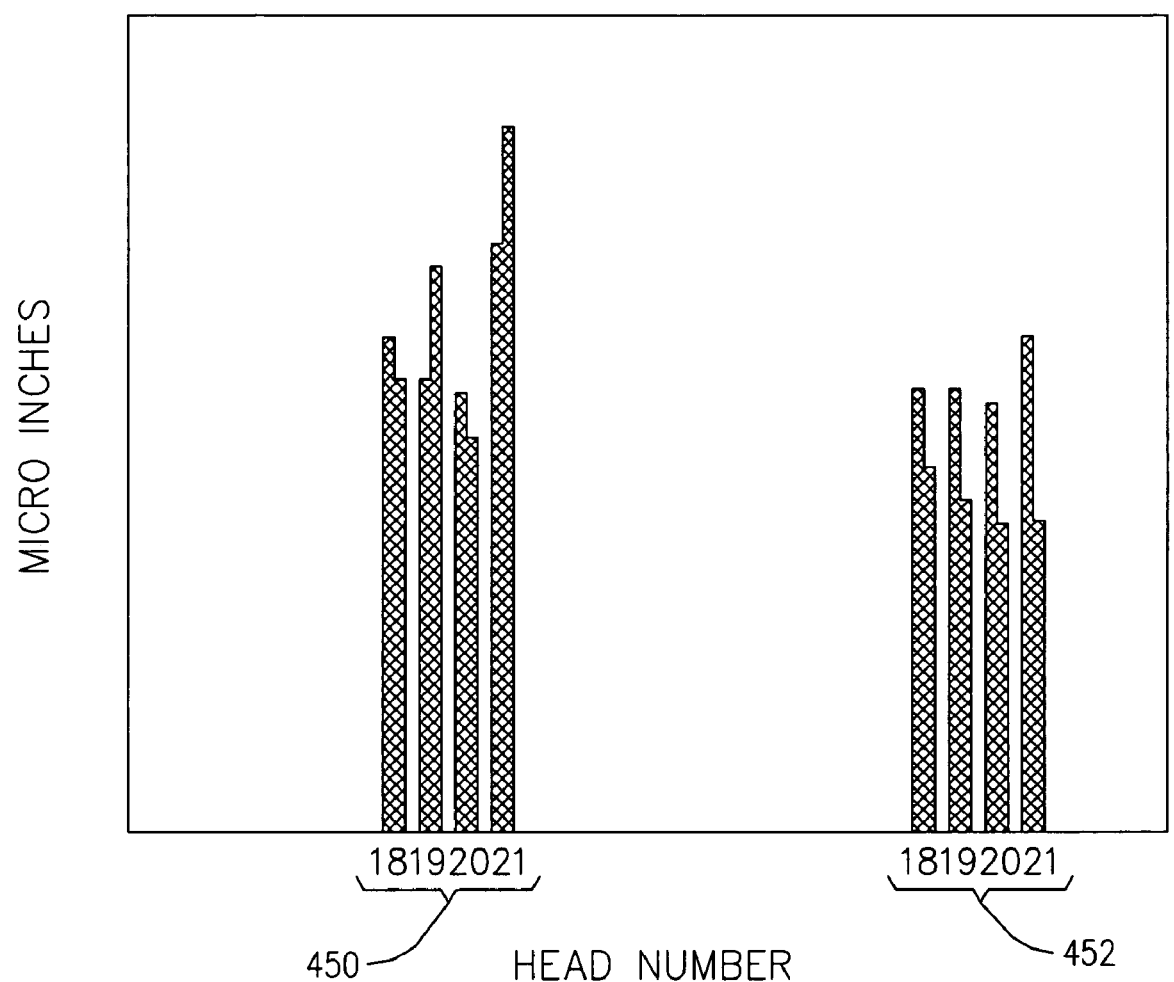

PRESSURE EQUALIZING FLUID FLOW STRIPPER APPARATUS

FIELD OF THE INVENTION

The embodiments of the present invention relate generally to the field of data writing systems and more particularly without limitation to windage management for reducing fluid flow excitation of data writing components.

BACKGROUND

Modern data storage devices such as disc drives are commonly used in a multitude of computer environments to store large amounts of data in a form that is readily available to a user. Generally, a disc drive has a magnetic disc, or two or more stacked magnetic discs, that are rotated by a motor at high speeds. Each disc has a data storage surface divided into data tracks where data is stored in the form of magnetic flux transitions.

A data transfer member such as a magnetic transducer is moved by an actuator to selected positions adjacent the data storage surface to sense the magnetic flux transitions in reading data from the disc, and to transmit electrical signals to induce the magnetic flux transitions in writing data to the disc. The active elements of the data transfer member are supported by suspension structures extending from the actuator. The active elements are maintained a small distance from the data storage surface by a fluid bearing generated by fluid currents caused by the spinning discs. The term "fluid bearing" is synonymous with the term "air bearing" where the fluid utilized in the disc drive is air. Alternatively, the term "fluid bearing" is applicable to other embodiments utilizing a fluid other than air, such as helium.

A continuing trend in the data storage industry is toward ever-increasing the data storage capacity and the processing speed while maintaining or reducing the physical size of the disc drive. Consequently, the data transfer member and the supporting structures are continually being miniaturized, and data storage densities are continually being increased. One result is an overall increased sensitivity to vibration as a percentage of track width.

One source of vibration comes from the fluid currents, or windage, that is created by the spinning discs. Fluid flow perturbations, and especially turbulent fluid flow, can excite the actuator and/or the disc creating vibrations. During servo track writing operations, for example, such vibrations can create actuator positional control errors resulting in irregular servo track formatting such as but not limited to track squeeze.

While various proposed solutions have been found operable, there remains a continued need for improvements in windage management for attenuating excitation energy. It is to such improvements that the claimed invention is generally directed.

SUMMARY OF THE INVENTION

Various embodiments of the present invention are generally directed to attenuating excitation energy of a rotatable storage medium using one or more plates each having a plurality of parallel channels to buffer fluid flow across an associated medium surface.

In accordance with some embodiments, an apparatus comprises a stationary first plate having a plurality of channels extending therein in facing relation to a common surface of a rotatable storage medium, said channels each having a proximal and adjacent an outermost radius of the medium and a distal end adjacent an innermost radius of the medium, said channels further being parallel to one another to buffer fluid flow across :aid common surface.

In accordance with other embodiments, an apparatus comprises a rotatable storage medium having opposing top and bottom medium surfaces. The apparatus further comprises a stationary first surface adjacent the top medium surface having a plurality of top channels extending therein and parallel to one another to buffer fluid flow across said top medium surface. A first channel of said plurality of top channels has a leading edge surface with respect to said fluid flow which extends in non-orthogonal relation to the top medium surface and a second channel of said plurality of top channels has a leading edge surface with respect to said fluid flow that is substantially orthogonal to the top medium surface.

BRIEF DESCRIPTION OF THE DRAWINGS

FIG. 12 is a bar chart indicating quantitative improvements associated with practicing embodiments of the present invention.

DETAILED DESCRIPTION

Figure 1:
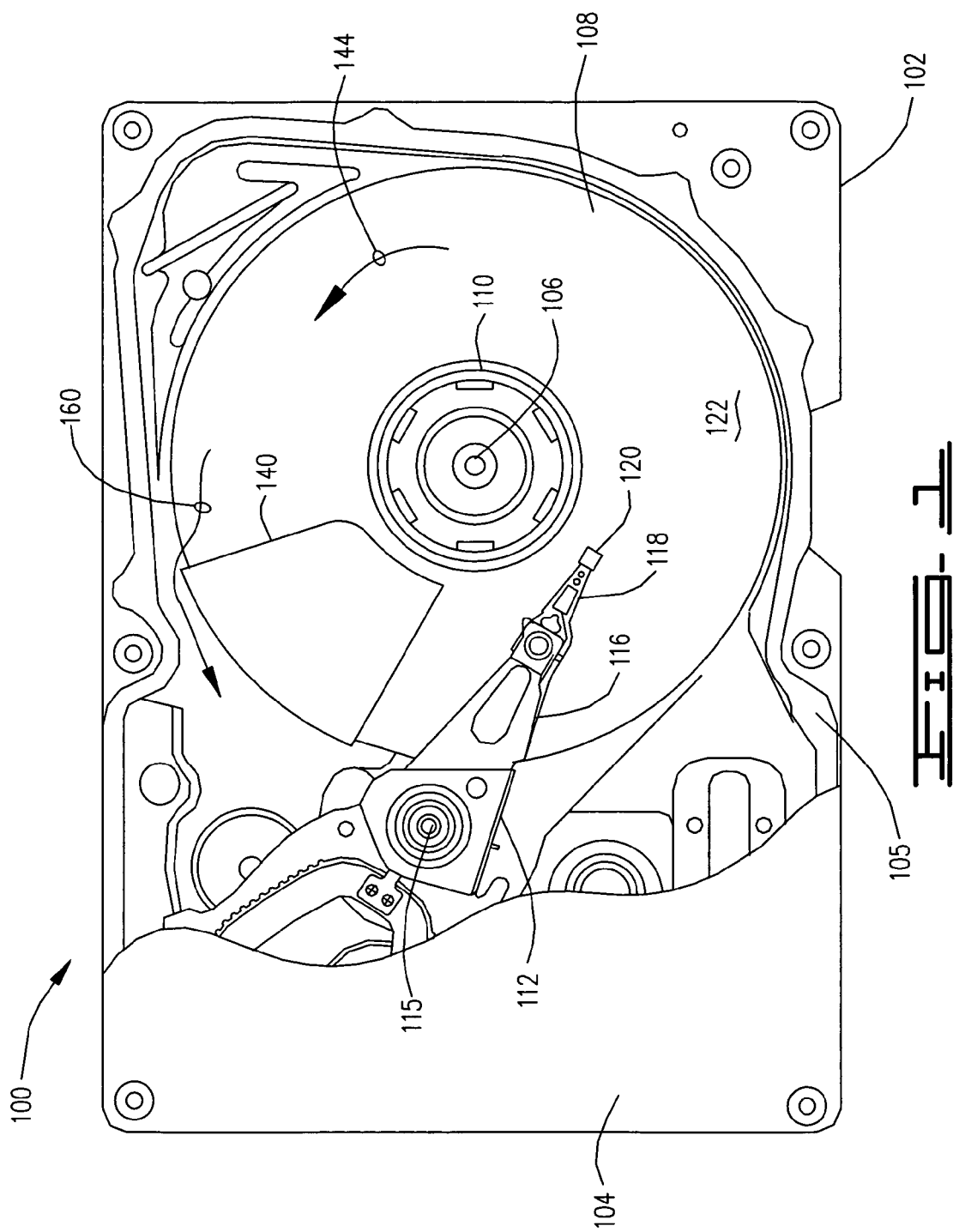
FIG. 1 is a plan view of a data storage device constructed in accordance with embodiments of the present invention.

Referring to the drawings in general, and more particularly to FIG. 1, shown therein is a plan view of a data storage device 100 that is constructed in accordance with embodiments of the present invention. The data storage device 100 includes a base 102 to which various disc drive components are mounted, and a cover 104 (partially cutaway) which together with the base 102 and a perimeter gasket 105 form an enclosure providing a sealed internal environment for the data storage device 100.

Figure 3:
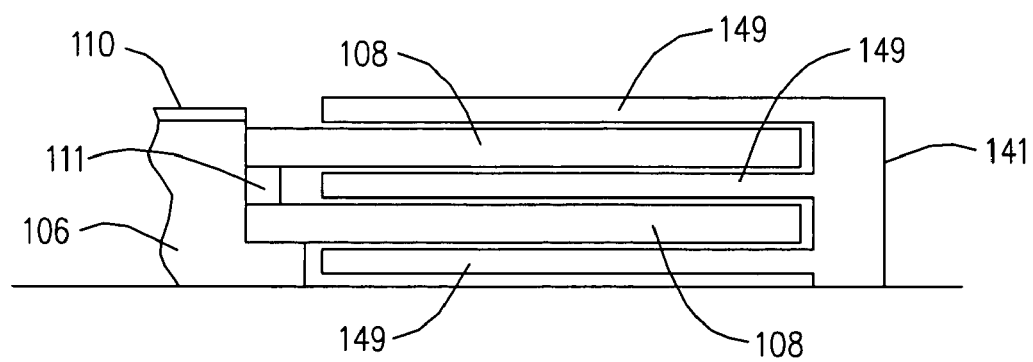
FIG. 3 is an elevational view of a related art fluid flow stripper and the discs.

Mounted to the base 102 is a motor 106 to which one or more discs 108 are stacked and secured by a clamp ring 110 for rotation at a high speed. Where a plurality of discs 108 are stacked to form a disc stack, adjacent discs 108 are typically separated by a disc spacer 111 (FIG. 3). An actuator 112 pivots around a pivot bearing 115 in a plane parallel to the discs 108. The actuator 112 has actuator arms 116 (only one shown in FIG. 1) that support load arms 118 in travel across the discs 108. The load arms 118 are flex members that support data transfer members, such as read/write heads 120, with each of the heads 120 operationally interfacing a surface of one of the discs 108 in a data reading and writing relationship. This relationship is maintained by a slider (not shown) which operably supports the head 120 on a fluid bearing sustained by fluid currents generated by the spinning discs 108. In some embodiments the fluid can be air; in other embodiments the fluid can be something other than air such as but not limited to helium.

Each of the discs 108 has a data storage region comprising a data recording surface 122. In some embodiments the head 120 is used to write servo information defining the track location; this is referred to as "in-situ" servo track writing. In other embodiments the servo information is prewritten to the discs 108 before they are installed into the data storage device 100; this is referred to as "ex-situ" servo track writing and is discussed below. The data tracks can be defined in various arrangements, such as being concentric or spiraled. In addition to in-situ servo track writing, the heads 120 are subsequently positioned adjacent a desired data track, from servo information feedback, in reading data from and writing data to the data storage surface 122. Accordingly, the data storage device 100 is sometimes referred to as a data writing device or a data reading device.

As noted earlier, the motor 106 spins the discs 108 at a high speed while the head 120 writes and/or reads to/from the data storage surface 122. The kinetic energy of the spinning discs is transferred by friction to the fluid at the disc/fluid boundary layer, thereby imparting a force vector to the fluid. The combined rotational and centrifugal forces from the spinning discs 108 creates a generally outwardly spiraling fluid flow pattern to the fluid surrounding the discs 108. This fluid flow, or windage, can be attenuated to reduce excitation energy on the actuator 112 and the disc 108 to a level below an acceptable threshold level by practicing embodiments of the present invention.

Figure 2:
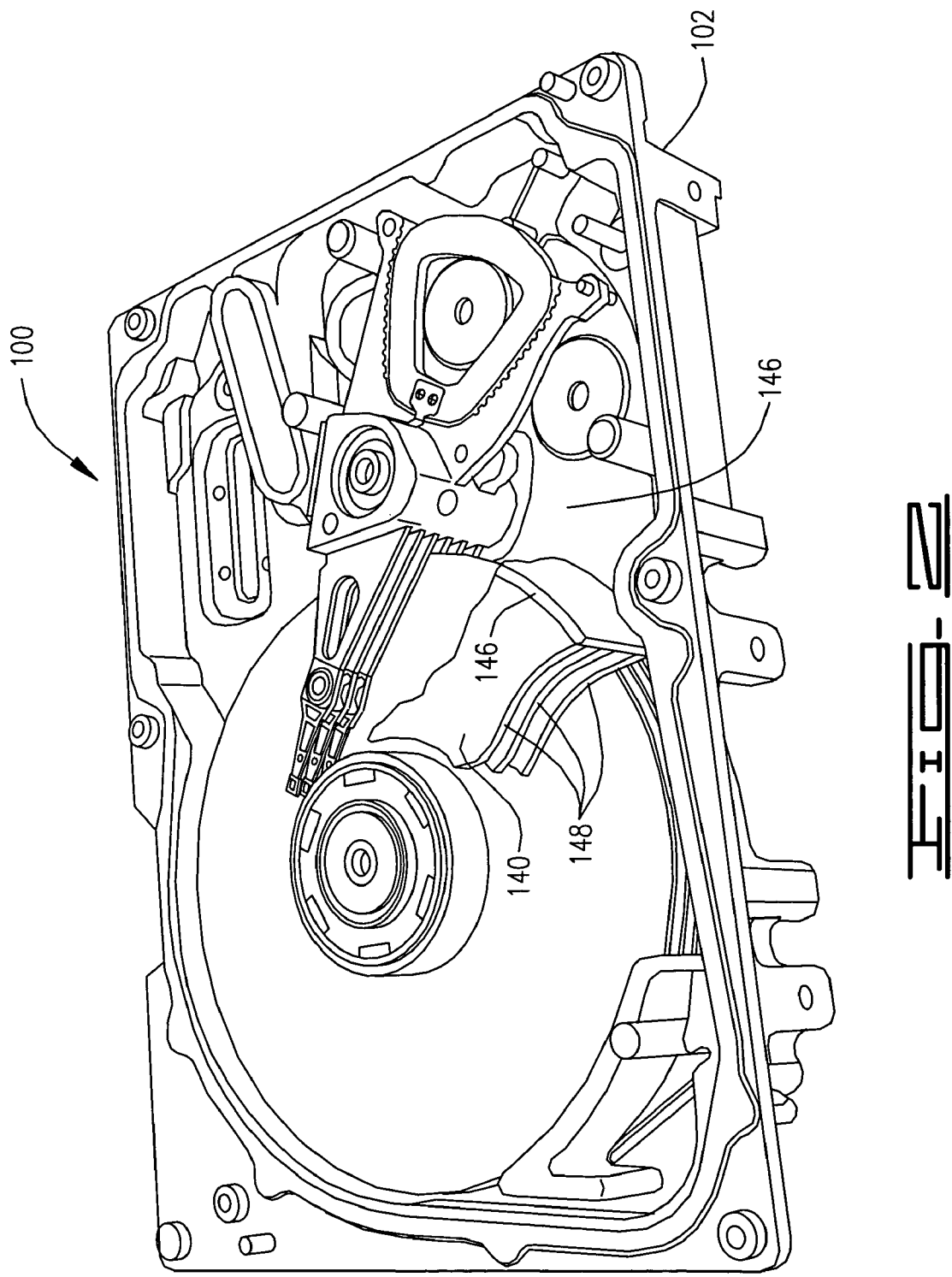
FIG. 2 is an isometric view of the data storage device of FIG. 1 with the discs removed for clarity.

In the illustrative embodiments of FIG. 1, the direction of disc 108 rotation is indicated by reference number 144. A fluid flow stripper 140 is disposed upstream of the actuator 112, with respect to the direction of disc 108 rotation. FIG. 2 is an isometric view of the data storage device 100 with the discs 108 removed for better viewing of the stripper 140. The stripper 140 has a body portion 146 and a number of plates 148 extending from the body 146. The body portion 146 can be readily adapted for fastening to the base 102. The plates 148 are spatially separated defining gaps therebetween for receivingly engaging one of the discs 108 in the disc stack. For example, the embodiments of FIG. 2 illustrate a stripper 140 defining two gaps for use with a two-disc 108 stack. In alternative embodiments, the illustrative stripper 140 of FIG. 2 can be used with three-disc and four-disc stacks where one of the plates 148 cooperates with either the base 102 or the cover 104 in enclosing the respective disc 108. The relatively small gap between the plates 148 and the respective disc 108 creates a flow restriction that strips away, or diverts, a portion 160 of the fluid.

Figure 4:
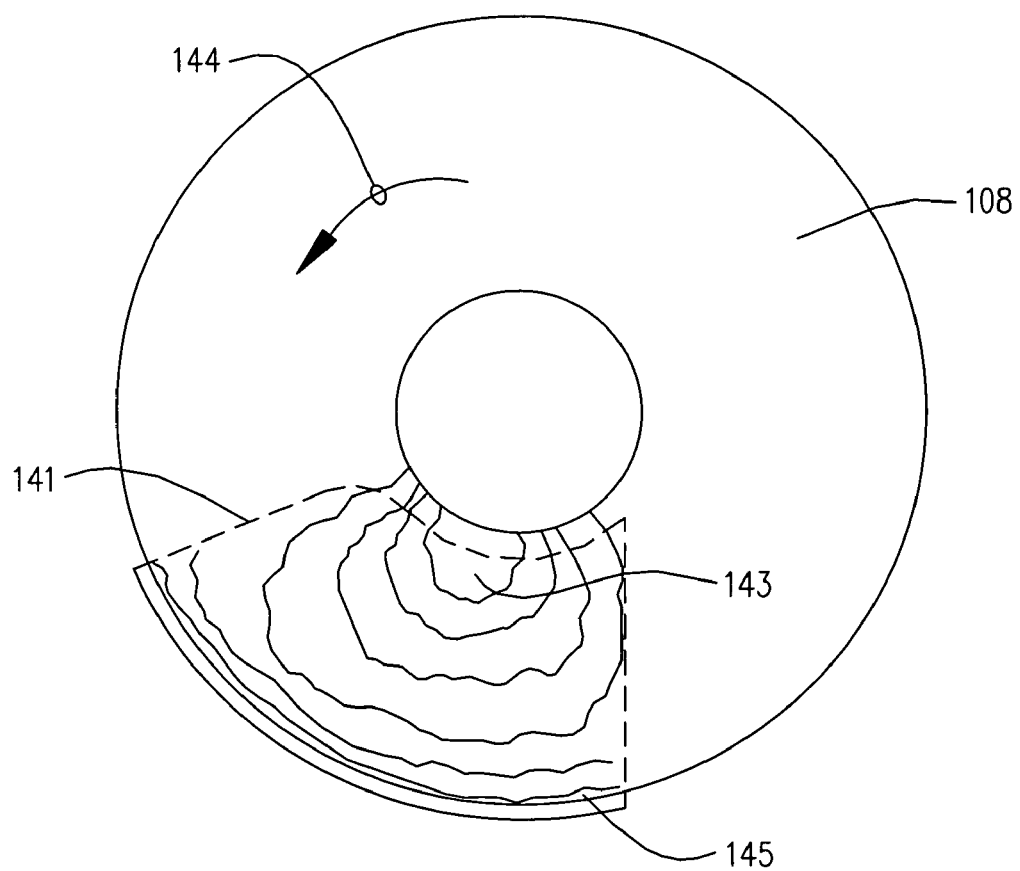
FIG. 4 is a diagrammatic representation of a pressure field distribution created by the spinning disc within the related art fluid flow stripper of FIG. 3.

To some extent, the portion of the fluid flow admitted into the gaps between the stripper 140 and the discs 108 is attenuated for reduced excitation acting on the downstream actuator 112 (FIG. 1). However, FIG. 3 is an elevational view of a related art stripper 141 comprising a plurality of plates 149 with planar surfaces in close mating relationship with the discs 108. FIG. 4 diagrammatically illustrates a problem associated with this type of related art stripper 141 is that a pressure gradient is created across the disc 108. That is, the outwardly spiraling fluid flow creates a lowest pressure area 143 at the inner diameter and a highest pressure area 145 at the outer diameter, with intermediate pressure areas therebetween. This pressure gradient can create eddy currents and even turbulent flows that adversely excite the downstream actuator 112 (FIG. 1). The embodiments of the present invention address this problematic pressure gradient by equalizing the static pressure of the fluid flowing through the stripper 140 (FIG. 1).

Figure 5:
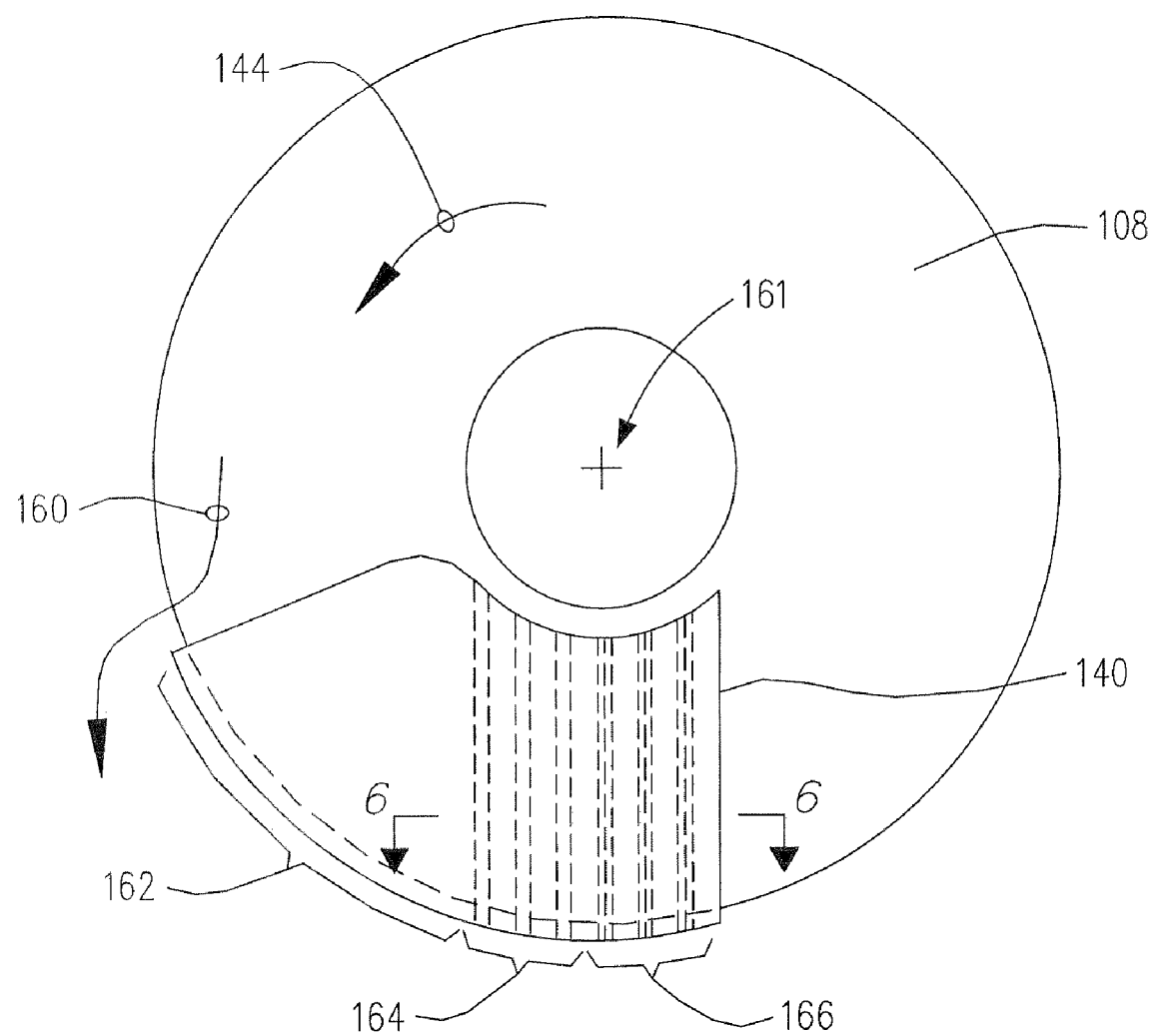
FIG. 5 is a plan view of a fluid flow stripper constructed in accordance with embodiments of the present invention.

FIG. 5 is a plan view of the stripper 140 receivingly engaging the disc 108, which rotates about central axis 161. In the illustrative embodiments of FIG. 5, the stripper 140 defines three zones through which the fluid passes. At the inlet to the first zone 162 a flow restriction is created for diverting the portion 160 away from the actuator 112 (FIG. 1). The portion of the fluid that is admitted to the stripper 140 then passes through the first zone 162, which has opposing planar surfaces in a close mating relationship with the disc 108 creating a relatively high pressure disc damping zone. The fluid then continues on to a second zone 164 and a third zone 166, which have radially disposed baffles defining channels that distribute the fluid dynamic pressure in order to equalize the static pressure across the disc.

Figure 6:
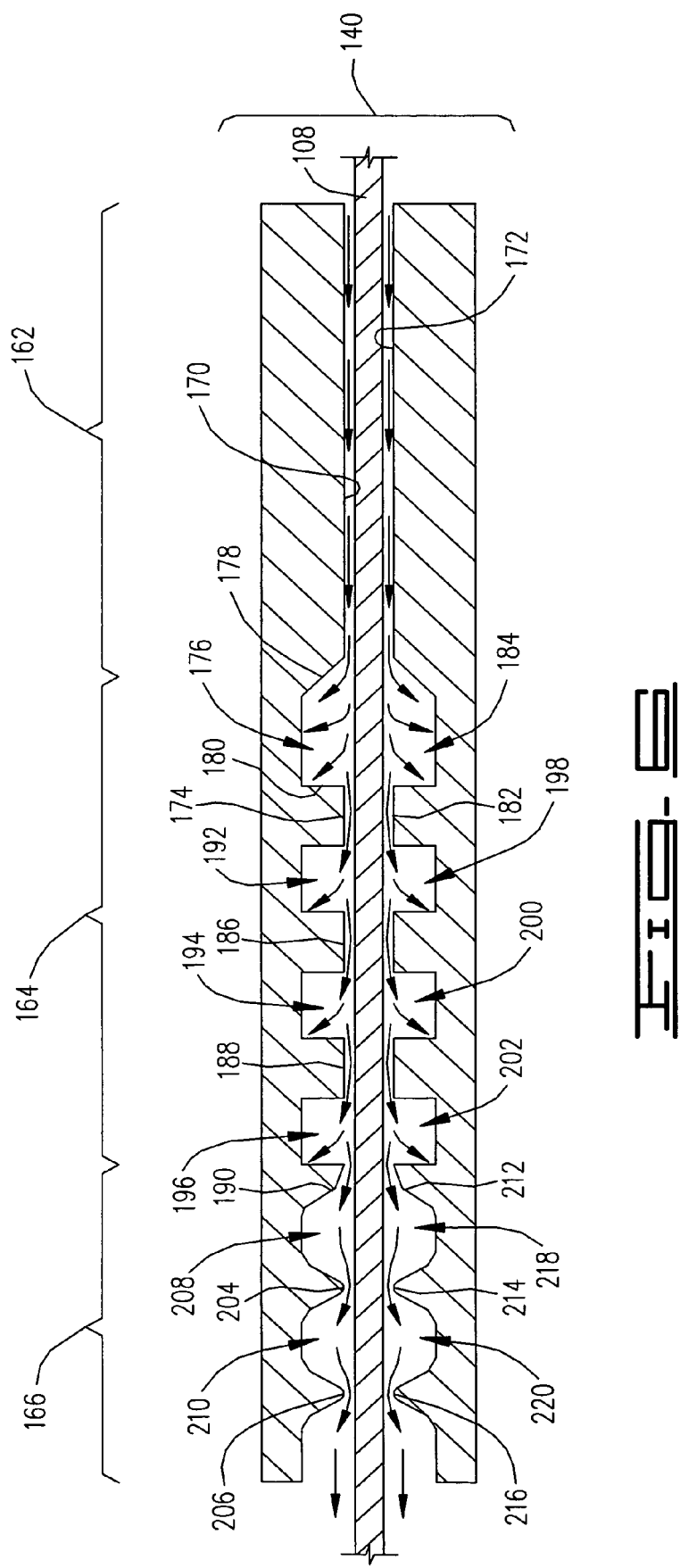
FIG. 6 is a cross sectional view of the fluid flow stripper of FIG. 5 taken generally along the section line 6-6 of FIG. 5.

FIG. 6 is a cross sectional view taken generally along the line 6-6 of FIG. 5. In the first zone 162 opposing spatially disposed planar surfaces 170, 172 are substantially parallel with the disc 108, defining a gap therebetween for receivingly engaging the disc 108 in a close mating relationship. The fluid in the small gap exerts a relatively high pressure for damping the disc 108.

In the second zone 164 a protuberant surface 174 defines a radially extending channel 176 at the outlet of the damping zone 162. For illustrative purposes the radially extending channel 176 has an angled leading edge 178 to more smoothly transition the flow leaving the damping zone 162, and an orthogonal trailing edge 180 to more abruptly slow the fluid velocity leaving the channel 176. This arrangement serves to momentarily pressurize the channel 176 as the fluid passes therethrough. Some of the pressurized fluid will flow radially inward within the channel 176, rather than flowing out of the channel 176, thereby partially equalizing the static pressure gradient across the disc 108.

An opposing protuberant surface 182 defines a radially extending channel 184 on the opposing side of the disc 108. In the illustrative embodiments of FIG. 6 the opposing channels 176, 184 are aligned and shaped equivalently to equalize the static pressure evenly on opposing sides of the disc 108.

Within the zone 164, additional protuberant surfaces 186, 188 and 190 define substantially rectangular channels 192, 194 and 196. Opposing channels 198, 200, and 202 are aligned and shaped equivalently therewith. As indicated by the fluid flow eddy currents, the dynamic pressure within the channels diminishes as the fluid flows sequentially through the channels, as the fluid flow loses energy as a result of the stages of dynamic pressure equalization having taken place in upstream channels. Even at the reduced dynamic pressures, however, the static pressure equalization continues within each downstream channel.

In zone 166, protuberant surfaces 190, 204, and 206 define angled transition surfaces and radiused edges defining channels 208 and 210. In like manner, protuberant surfaces 212, 214, and 216 define aligned and equivalent channels 218, 220 on the opposing side of the disc 108. The smoother channels of the zone 166 are less obtrusive to the fluid flow, being related to the generally reduced dynamic pressure of the fluid flow in comparison to that upstream. The smoother channel also advantageously tends to straighten the flow leaving the stripper 140.

The illustrative embodiments of FIG. 6 thus include a transition channel 176 followed by three sharp rectangular channels 192, 194, 196 in zone 164 and two smooth v-shaped channels 208, 210 in zone 166. This arrangement has been proven effective in equalizing the fluid pressure and straightening the fluid flow leaving the stripper 140 so as to not excite the downstream actuator 112 (FIG. 1).

Figure 7:
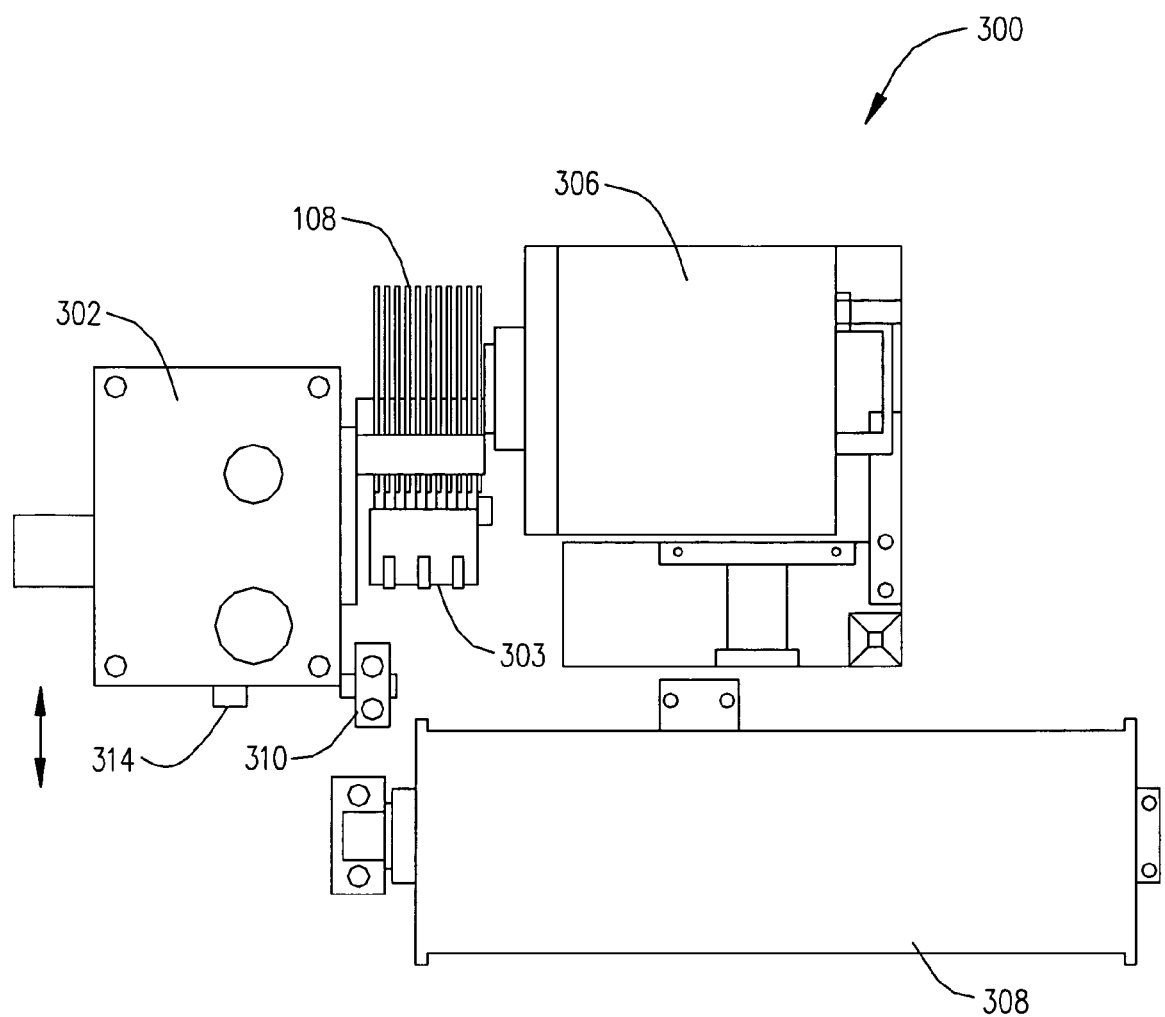
FIG. 7 is a plan view of an ex-situ servo track writer constructed in accordance with embodiments of the present invention.
Figure 8:
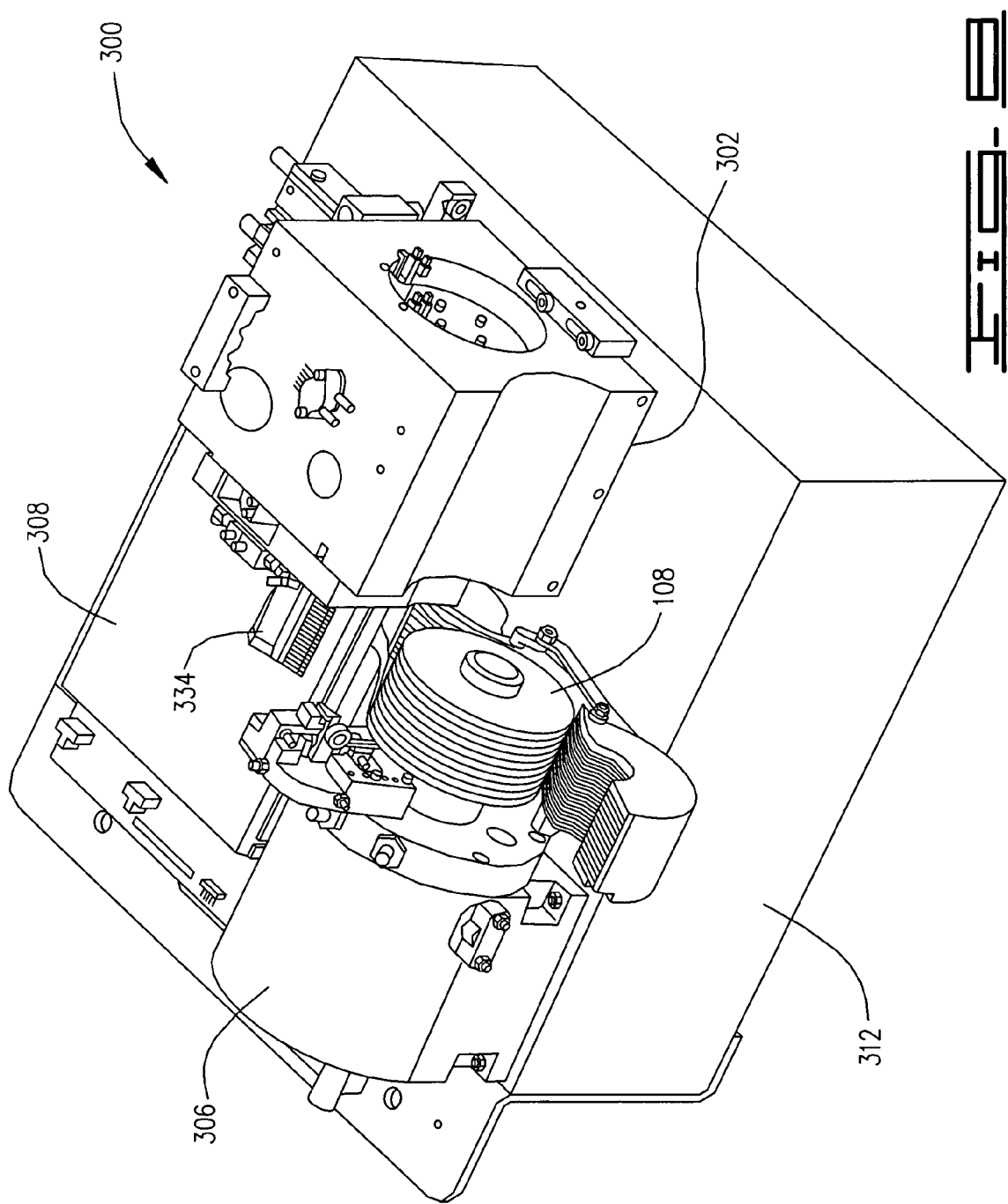
FIG. 8 is an isometric view of the servo track writer of FIG. 7.
Figure 9:
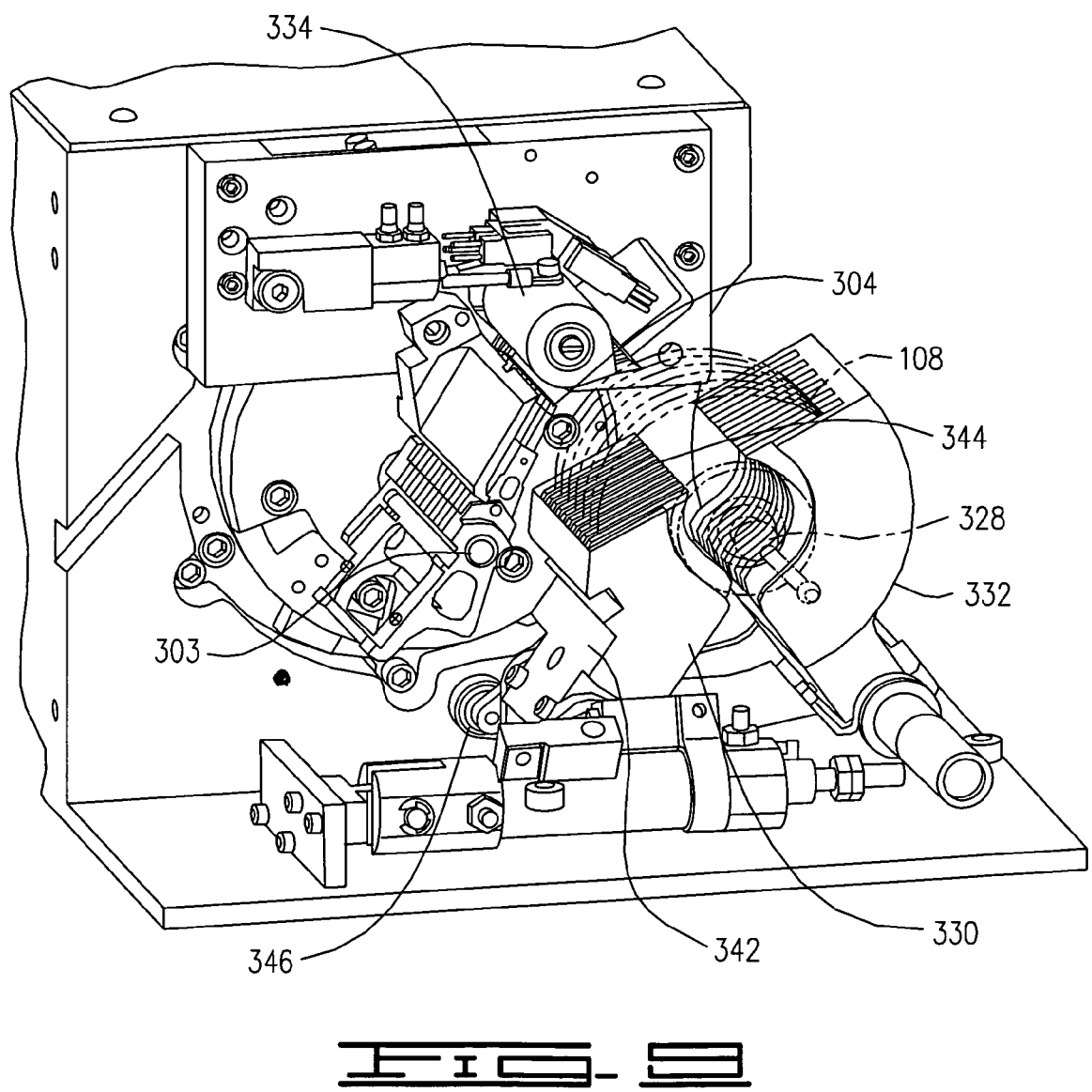
FIG. 9 is an enlarged detail of a portion of FIG. 8.

Turning now to FIGS. 7-9, embodiments of the present invention are now addressed with regard to an ex-situ servo track writing device 300 that is used to write servo data information to a multi-disc stack of discs 108. The device 300 includes an actuator assembly 302 for positioning an actuator 303 supporting servo recording heads 304 at a distal end thereof for recording the servo information. A motor hub assembly 306 rotationally presents the discs 108 to the recording heads 304. A vacuum chuck 308 secures the actuator assembly 302 between a servo writing position, shown in FIG. 9, and a retracted position where the multi-disc stacks are loaded and unloaded, shown in FIG. 8. A laser interferometer 310 provides position control for the angular displacement of the servo recording heads 304.

A base 312, such as a granite slab, supports the device 300 components. A linear slide 314 defines a constrained lateral movement for the actuator assembly 302 between the servo writing and the load/unload positions. With the actuator assembly 302 in the load/unload position (FIG. 8) a spindle hub 328 supporting the plurality of discs 108 is loaded to the motor 306. A fluid flow stripper 330 and a fluid flow dam 332 are then articulated to partially enclose the plurality of discs 108. The actuator assembly 302 is then moved laterally by the slide 314 into operable engagement with the multi-disc stack. A comb 334 pivots to clearingly engage the plurality of servo recording heads 304 with the respective discs 108 so that the actuator 303 can be loaded to the multi-disc stack. With the actuator 303 loaded, the motor 306 spins the multi-disc stack and servo track writing begins.

As above, the spinning discs 108 create windage that can adversely excite the actuator 303 and the discs 108. The stripper 330 attenuates the windage energy to prevent this adverse excitation. The stripper 330 has a body portion 342 and a plurality of spatially disposed plates 344 defining gaps therebetween that are receivingly engageable with the discs 108. Here, however, the body portion 342 is journalled by pivots 346 for articulating movement between the retracted position (FIG. 8) and the engaged position (FIG. 9). In the retracted position the plates 344 are clearingly disengaged from the disc 108 permitting movement of the disc 108 along the axis of disc 108 rotation for loading and unloading the multi-disc stack to the device 300.

Figure 10:
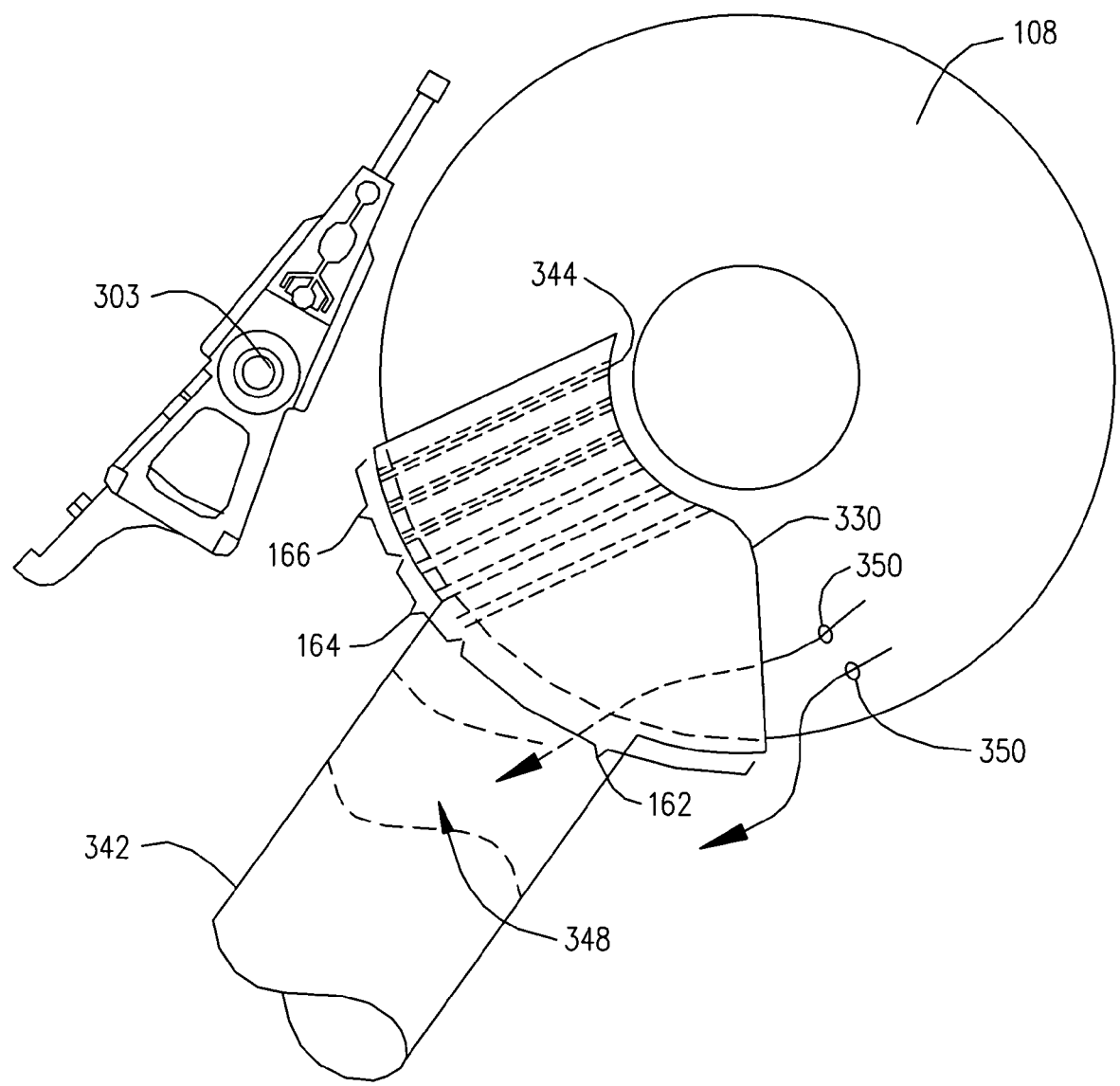
FIG. 10 is a plan view of the fluid flow stripper of the servo track writer of FIG. 7.

FIG. 10 is an enlarged elevational view of the stripper 330 of FIG. 9. The body 342 defines a passageway 348 through which the plates 344 strip away and divert a portion 350 of the windage created by the spinning discs 108. Otherwise, the portion of the fluid entering the stripper 330 is acted upon to attenuate fluid flow excitation energy that would otherwise adversely affect the downstream actuator 303. The plates 344 are configured in the same manner as described above and shown particularly in FIGS. 5 and 6, so as to provide a multi-zoned arrangement whereby the admitted fluid passes first through the disc damping zone 162, then the first and second baffle zones 164, 166.

Figure 11:
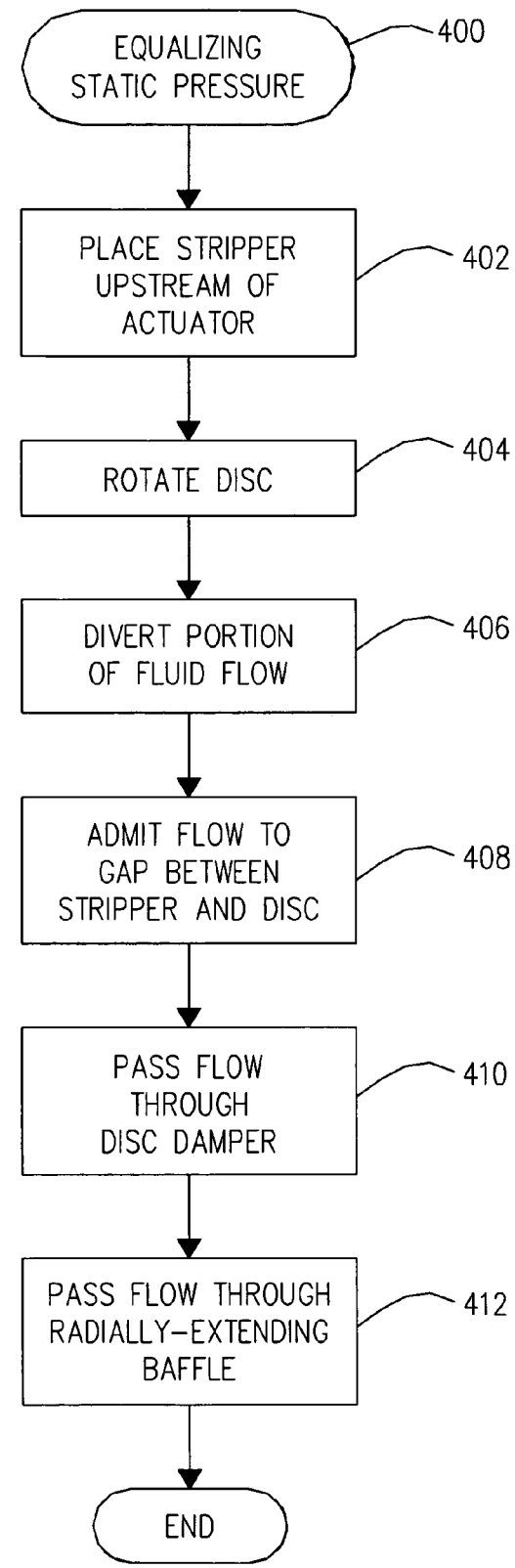
FIG. 11 is a block diagram of a method for equalizing static pressure in accordance with embodiments of the present invention.

FIG. 11 illustrates a method 400 of EQUALIZING STATIC PRESSURE illustrating steps for practicing the embodiments of the present invention. The method 400 includes placing the stripper 140, 330 around the disc 108 at a location upstream of the actuator 112, 203 in block 402. Clearly, in alternative embodiments the stripper 140, 330 could be placed in other locations to attenuate windage excitation, such as but not limited to placing the stripper 140, 330 upstream of a filter device. In block 404 the disc 108 is rotated, creating the windage addressed by the embodiments of the present invention. In block 406 an upstream portion of the windage is diverted away from the actuator 112, 203 by the stripper 140, 330. In block 408 the rest of the fluid flow is admitted into the gap between the stripper 140, 330 and the disc 108. In block 410 the admitted fluid flow passes through a disc damper zone. In block 412 the admitted fluid flow passes through a radially-extending baffle zone.

The passing the admitted portion step can comprise passing the fluid past two or more equivalent baffles in the baffle zone. The passing the admitted portion step can further comprise passing the fluid through differently configured baffles, such as sharp and smooth edged baffles. Preferably, like baffles are formed and aligned on opposing sides of the disc.

FIG. 12 illustrates results of testing the stripper 140, 330 of the present invention. The grouping of data 450 indicates the amount of track squeeze present in a sample of heads and measured both at the disc 108 inner and outer diameters, for a stripper in accordance with related art embodiments such as illustrated by stripper 141 in FIG. 3. The grouping of data 452 indicates the results of the same measurement for the stripper 140, 330 of the embodiments of the present invention. For the latter, a total track squeeze improvement of over 20% was observed.

Summarizing generally, a stripper (such as 140, 330) is provided for attenuating windage created by a rotating disc (such as 108) that can otherwise create disturbances acting on the disc an on a downstream actuator (such as 112, 303) disposed in a data reading and writing relationship with the disc.

The stripper can comprise a body (such as 146, 342) and a pair of spatially disposed plates (such as 148, 344) extending from the body defining a gap therebetween that is receivingly engageable with the disc. In a disc damping zone (such as 162) the plates are substantially planar and parallel with the discs in a close mating relationship. A first baffle zone (such as 164) has a protuberant surface (such as 174, 186, 188, 190) defining one or more radially extending channels (such as 176, 192, 194, 196) where the fluid dynamic pressure partially equalizes the fluid static pressure radially across the disc. The first baffle zone can have a protuberant surface defining one or more channels (such as 184, 198, 200, 202) on the opposing side of the disc. Preferably, the opposing channels are aligned and of like structural arrangement. A second baffle zone (such as 166) has a protuberant surface (such as 190, 204, 206) defining one or more differently configured radially extending channels (such as 208, 210) for further equalization. Opposing channels (such as 218, 220) can be provided in the second baffle zone on the opposing side of the disc.

In some embodiments the body is adapted for articulating movement between a retracted position and an engaged position, such that in the retracted position the plates are clearingly disengaged from the disc permitting movement of the disc in a direction along an axis of disc rotation.

Preferably, the actuator operably engages a disc stack having a plurality of spaced-apart discs, and the stripper comprises a plurality of plates with each of the plurality of plates disposed adjacent to a side of one of the plurality of discs.

In some embodiments a method (such as 400) is provided for equalizing static pressure created by the rotating disc. The method comprises admitting the flow into a gap between the disc and the stripper (such as 408), and passing the flow past the radially extending baffle (such as 412).

In some embodiments a fluid flow stripper device is provided for a rotating disc, comprising a pair of spatially disposed plates defining a gap for receivingly engaging the disc, and protuberant surfaces on the plates attenuating fluid flow disturbances by steps for equalizing the static pressure in the fluid across the disc. In some embodiments the steps for equalizing can be characterized by passing the fluid through a zone comprising one or more radially disposed sharp baffles. In some embodiments the steps for equalizing can be characterized by passing the fluid through a zone comprising one or more radially disposed smooth baffles.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the number and arrangement of the baffle channels without departing from the scope and spirit of the present invention. In addition, although the preferred embodiments described herein are directed to a data writing device, it will be appreciated by those skilled in the art that the teachings of the present invention can be applied to other systems without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. An apparatus comprising a stationary first plate having a plurality of channels extending therein in facing relation to a common surface of a rotatable storage medium, wherein the plurality of channels comprises sequentially arranged first, second and third channels with respect to fluid flow, wherein the first channel is characterized as a transition channel with a leading sidewall non-orthogonal with respect to the common surface, wherein the second channel is characterized as a rectilinear channel with substantially orthogonal sidewalls, and wherein the third channel is characterized as a substantially v-shaped channel, said channels each having a proximal end adjacent an outermost radius of the medium and a distal end adjacent an innermost radius of the medium, said channels further being parallel to one another to buffer the fluid flow across said common surface.

2. The apparatus of claim 1, wherein the common surface is characterized as a first common surface and wherein the storage medium comprises an opposing second common surface, and wherein the apparatus further comprising a second plate having a plurality of channels extending therein in facing relation to the second common surface and being parallel to one another.

3. The apparatus of claim 1, wherein said first plate extends less than about 50% around the overall circumference of the medium.

4. The apparatus of claim 3, wherein the storage medium rotates about a central axis, wherein each said channel comprises a leading edge with respect to said fluid flow, and wherein a first said leading edge extends along a first line which passes on a first side of the central axis with respect to said fluid flow and a second said leading edge extends along a second line which passes on an opposing second side of the central axis with respect to said fluid flow.

5. The apparatus of claim 1, further comprising a plurality of regions each defined by at least one channel from said plurality of channels and at least one protuberance which extends toward the common surface of the storage medium.

6. The apparatus of claim 1, wherein more than one of the plurality of channels comprises a sidewall that defines a rectilinear cross-section for said channel.

7. The apparatus of claim 1, wherein more than one of the plurality of channels comprises a sidewall that extends at a non-orthogonal angle with respect to the common surface of the storage medium.

8. The apparatus of claim 1, wherein more than one of the plurality of channels comprises a curvilinear sidewall.

9. The apparatus of claim 1, further comprising a leading protuberance upstream of said plurality of channels with respect to said fluid flow with a facing surface in close proximity to the common surface of the storage medium to restrict passage of said fluid flow to said plurality of channels.

10. The apparatus of claim 1, wherein said plurality of channels are characterized as linear channels of substantially equidistant spacing.

11. An apparatus, comprising:
    a rotatable first storage medium having opposing top and bottom medium surfaces;
    a stationary first surface adjacent the top medium surface having a plurality of top channels extending therein and parallel to one another to buffer fluid flow across said top medium surface, wherein a first channel of said plurality of top channels has a leading edge surface with respect to said fluid flow which extends in non-orthogonal relation to the top medium surface and a second channel of said plurality of top channels has a leading edge surface with respect to said fluid flow that is substantially orthogonal to the top medium surface;
    a second storage medium axially aligned with the first storage medium; and
    a stationary second surface nominally identical to the first surface in facing relation to a selected top or bottom surface of the second storage medium.

12. The apparatus of claim 11, wherein the top channels of the stationary first surface form a plurality of top channel regions and bottom channels of a stationary third surface form a plurality of bottom channel regions, and wherein the top channel regions and the bottom channel regions are aligned in opposing relation to one another with respect to the first storage medium.

13. The apparatus of claim 11, wherein each of the plurality of top channels of the stationary first surface has a proximal end adjacent an outermost radius of the first storage medium and a distal end adjacent an innermost radius of the first storage medium.

14. The apparatus of claim 11, further comprising a leading protuberance upstream of said plurality of top channels of the stationary first surface with respect to said fluid flow with a facing surface in close proximity to the top medium surface of the first storage medium to restrict passage of said fluid flow to said plurality of top channels of the stationary first surface.

15. The apparatus of claim 11, wherein the first storage medium rotates about a central axis, wherein each of the plurality of top channels of the stationary first surface comprises a leading edge with respect to said fluid flow, and wherein a first said leading edge extends along a first line which passes on a first side of the central axis with respect to said fluid flow and a second said leading edge extends along a second line which passes on an opposing second side of the central axis with respect to said fluid flow.

* * * * *